US007615971B2

(12) United States Patent
Ichimasa

(10) Patent No.: US 7,615,971 B2
(45) Date of Patent: Nov. 10, 2009

(54) CAPACITOR CHARGING CIRCUIT, FLASH UNIT, AND CAMERA

(75) Inventor: Shoji Ichimasa, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/115,723

(22) Filed: May 6, 2008

(65) Prior Publication Data

US 2008/0211461 A1 Sep. 4, 2008

Related U.S. Application Data

(63) Continuation of application No. 11/146,945, filed on Jun. 7, 2005, now Pat. No. 7,443,141.

(30) Foreign Application Priority Data

Jun. 14, 2004 (JP) ............................. 2004-176082

(51) Int. Cl.
*H01M 10/46* (2006.01)
(52) U.S. Cl. .................................... 320/166
(58) Field of Classification Search ................. 320/127, 320/135, 140, 166, 167
See application file for complete search history.

(56) References Cited

U.S. PATENT DOCUMENTS

| 4,071,884 | A | | 1/1978 | Maigret | |
|---|---|---|---|---|---|
| 4,422,032 | A | * | 12/1983 | Kakumoto et al. | .......... 320/139 |
| 5,412,556 | A | * | 5/1995 | Marinus | .................. 363/21.05 |
| 6,038,143 | A | * | 3/2000 | Miyazaki et al. | .............. 363/19 |
| 6,417,649 | B1 | | 7/2002 | Brink | |
| 6,853,563 | B1 | * | 2/2005 | Yang et al. | ................ 363/21.15 |
| 2003/0090240 | A1 | | 5/2003 | Schenkel et al. | |

FOREIGN PATENT DOCUMENTS

JP         2002-6371 A         1/2002

* cited by examiner

*Primary Examiner*—Edward Tso
(74) *Attorney, Agent, or Firm*—Canon U.S.A., Inc., IP Division

(57) ABSTRACT

The present invention provides a flash discharging circuit for simplifying the charging of electric power in a capacitor. When energy discharged from a transformer for storing and discharging energy is charged in a main capacitor of the circuit, a detection voltage inputted to a first input terminal of a comparator so as to detect a primary current flowing through a primary winding of the transformer is compared with a reference voltage inputted to a second input terminal of the comparator. According to a result of the comparison, it is detected that a predetermined primary current flows through the primary winding of the transformer. When the primary current flowing through the primary winding of the transformer is turned off, the reference voltage is set to be lower than the detection voltage.

5 Claims, 5 Drawing Sheets

CAPACITOR CHARGING CIRCUIT, FLASH UNIT, AND CAMERA

CROSS REFERENCE TO RELATED APPLICATIONS

This application is a continuation of application Ser. No. 11/146,945 filed Jun. 7, 2005, which claims the benefit of Japanese Patent Laid-Open No. 2004-176082, filed Jun. 14, 2004, all of which are hereby incorporated by reference herein in their entirety.

BACKGROUND OF THE INVENTION

1. Field of the Invention

The present invention relates to a capacitor charging circuit and, more particularly, to a circuit suitable for charging a capacitor.

2. Description of the Related Art

In a related flyback-type flash charging circuit, electric power supplied from a battery is boosted by a boosting transformer. Subsequently, a flyback pulse generated therein is rectified to thereby charge a main capacitor. When a picture is taken, the charged main capacitor is discharged to thereby cause a flash unit to flash. Japanese Patent Laid-Open No. 2002-6371 discloses an apparatus that controls charging of a main capacitor by disabling a clock signal to be inputted to a gate of an n-channel MOSFET (metal-oxide semiconductor field-effect transistor), which is connected in series to a primary winding of a boosting transformer, such that the n-channel MOSFET is maintained in an off-state during a second current flow through the boosting transformer.

However, the conventional charging circuit performs an oscillation operation based on PWM (Pulse Width Modulation) signals and needs PWM signals. Recent miniaturization of cameras has resulted in miniaturization of transformers. Thus, there is a limit to each of a primary inductance and a primary current, with the result of a high oscillating frequency. That is, the conventional charging circuit needs high-frequency PWM signals. Consequently, in some camera systems, the conventional charging circuit has a drawback in that a complex circuit for charging electric power in a capacitor is required.

SUMMARY OF THE INVENTION

The present invention is accomplished in view of the drawback. Accordingly, an aspect of the invention is to provide a less complex circuit for charging electric power in a capacitor.

According to an aspect of the invention, there is provided a capacitor charging circuit, which comprises a transformer adapted to store and discharge energy, a main capacitor adapted to charge energy discharged from the transformer, a switch circuit adapted to regulate a flow of an electric current in a primary winding of the transformer, a detection control circuit adapted to control the switch circuit according to a result of a comparison between a detection voltage, which is used for detecting an electric current flowing through the primary winding of the transformer, and a reference voltage, and a reference voltage control circuit adapted to set, after the detection control circuit causes the switch circuit to turn off an electric current flowing through the primary winding, the reference voltage to be lower than the detection voltage.

According to another aspect of the invention, there is provided a capacitor charging circuit which comprises a transformer adapted to store and discharge energy, a main capacitor adapted to charge energy discharged from the transformer, a switch circuit adapted to regulate a flow of an electric current in a primary winding of the transformer, a detection control circuit adapted to control the switch circuit according to a result of a comparison between a detection voltage, which is used for detecting an electric current flowing through the primary winding of the transformer, and a reference voltage, a secondary current detection circuit adapted to detect, after the detection control circuit causes the switch circuit to turn off an electric current flowing through the primary winding, a secondary current flowing through a secondary winding of the transformer, a reference voltage control circuit adapted to set, when a secondary current flowing through the secondary winding of the transformer is detected by the secondary current detection circuit, the reference voltage to be lower than the detection voltage, and a delay circuit adapted to delay, when the detection control circuit causes the switch circuit to turn off an electric current flowing through the primary winding, the detection voltage to be inputted to the detection control circuit.

Other features and advantages of the invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF EMBODIMENTS

Hereinafter, exemplary embodiments of the invention are described by referring to the accompanying drawings.

First Embodiment

Figure 1:
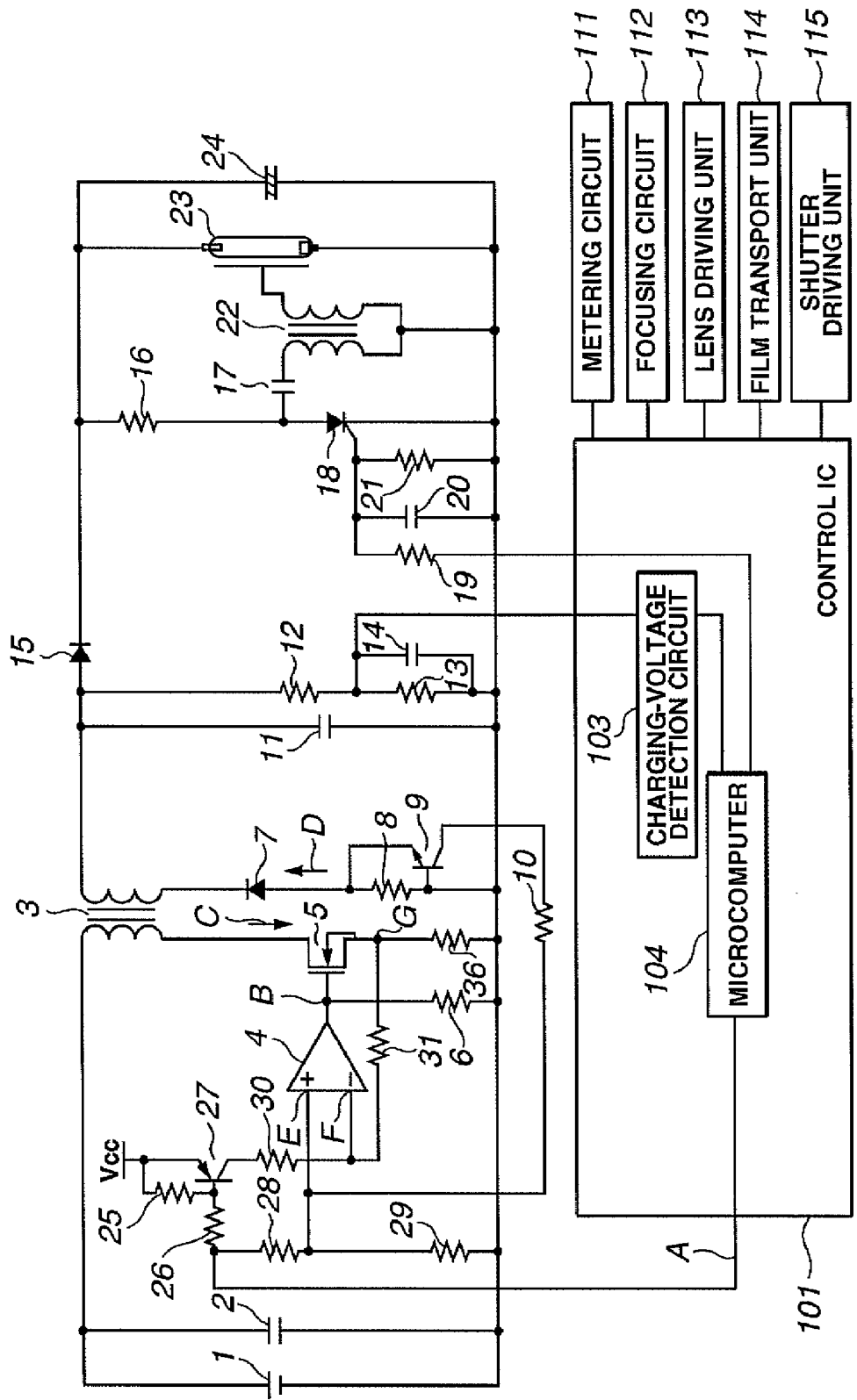
FIG. 1 is a diagram schematically showing the entire electrical configuration of a flash charging circuit according to a first embodiment of the invention.

FIG. 1 is a circuit diagram schematically showing the entire electrical configuration of a flash charging circuit according to a first embodiment of the invention. FIG. 1 also shows other constituents of a camera, in addition to the flash charging circuit.

In FIG. 1, reference numeral 1 designates a battery serving as a power supply. Reference numeral 2 denotes a capacitor connected in parallel to the battery 1.

Reference numeral 3 designates a transformer that has a primary winding, a secondary winding, and an iron core. Electric current is applied to this transformer 3 through a loop including the positive electrode of the battery 1, the primary winding, FET (Field Effect Transistor) 5, a resistor 36, and the negative electrode of the battery 1. Thus, energy is stored in the core of the transformer 3. Consequently, a back electromotive force is generated by this energy.

Reference numeral 4 designates a comparator having a positive input terminal E connected to resistors 28 and 29. A reference voltage (that is, a comparison voltage corresponding to a primary current), which is obtained by dividing an output voltage of a control IC (Integrated Circuit) 101, is inputted to the positive input terminal E of this comparator 4.

A primary current of the transformer 3 is converted by the resistor 36 into a voltage that is inputted to a negative input terminal F of the comparator 4 through the resistor 31. This negative input terminal F is also connected to the resistor 30.

An output terminal of the comparator 4 is connected to a gate of the FET 5. According to an output signal B from the comparator 4, the FET 5 drives a primary current C of the primary winding of the transformer 3.

Reference numeral 6 designates a resistor that is connected between the gate of the FET 5 and the negative electrode of the battery 1. Reference numeral 36 denotes a resistor that converts the primary current C, which flows in the primary winding of the transformer 3 through the FET 5, into a voltage, as described above. Thus, in the first embodiment, the resistor 36 corresponds to the primary current detection resistor. Reference numerals 25 and 26 designate resistors. The resistors 25 and 26 are connected to a transistor 27. Concretely, the resistor 25 is connected between the base and the emitter of the transistor 27. The resistor 26 is connected to the base of the transistor 27 at a terminal thereof, and to the control IC 101 at the other terminal thereof.

The emitter of the transistor 27 is connected to an auxiliary power supply $V_{cc}$ of the camera. The transistor 27 is turned on/off in response to a signal A sent from the control IC 101 through the resistor 26. Reference numerals 28 ad 29 denote resistors. A terminal of the resistor 28 is connected to a terminal of the resistor 29. The other terminal of the resistor 28 is connected to the control IC 101. The other terminal of the resistor 29 is connected to the negative electrode of the battery 1.

Reference numeral 30 designates a resistor connected to the collector of the transistor 27 at a terminal thereof, and also connected to the negative input terminal F of the comparator 4 at the other terminal thereof. Reference numeral 31 denotes a resistor connected to the negative input terminal F of the comparator 4 at a terminal thereof and also connected at the other terminal thereof between the resistor 36 and the FET 5. A voltage based on the primary current of the transformer 3 is inputted to the comparator 4 through this resistor 31.

Reference numeral 24 designates a main capacitor that stores electric charges. Reference numeral 9 denotes a high-voltage rectifier diode. This high-voltage rectifier diode 7 has a cathode connected to the winding start of a secondary winding of the transformer 3, and also has an anode connected to a transistor 9 and a resistor 8. The resistor 8 is connected between the base and the emitter of the transistor 9. The base of the transistor 9 is connected to the negative electrode of the main capacitor 24 (thus, the negative electrode of the battery 1), while the emitter of the transistor 9 is connected to the winding start of the secondary winding of the transformer 3 through the high-voltage rectifier diode 7. A loop, in which electric current D flows due to a back electromotive force generated by the secondary winding of the transformer 3, comprises the high-voltage rectifier diode 7 and the rectifier diode 15. The emitter of the transistor 9 may be connected directly to the wind start of the secondary winding of the transformer 3 without interposing the high-voltage rectifier diode 7 therebetween.

Reference numeral 10 denotes a resistor that is connected to the collector of the transistor 9 at a terminal thereof and is also connected to the positive input terminal E of the comparator 4 at the other terminal thereof. The rectifier diode 15 is connected at the anode thereof to the wiring end of the secondary wiring of the transformer 3, and is also connected at the cathode thereof to the positive electrode of the main capacitor 24. Reference numerals 12 and 13 denote resistors. Thus, electric charges stored in the main capacitor 24 are prevented from being discharged by resisters 12 and 13.

Reference numeral 11 designates a capacitor that has a terminal connected between the winding end of the secondary winding of the transformer 3 and also has the other terminal connected to the negative electrode of the battery 1. A charging voltage of the capacitor 11 is nearly equal to that of the main capacitor 24. The series-connected resistors 12 and 13 are parallel-connected to the capacitor 11. These resistors 12 and 13 divide the voltage of the capacitor 11. The divided voltage is inputted to a charging-voltage detection circuit 103 provided in the control IC 101. Reference numeral 14 denotes a capacitor that eliminates noises from the voltage inputted to the charging-voltage detection circuit 103.

Reference numerals 16 and 17 denote a resistor and a capacitor, respectively. The resistor 16 is connected at a terminal thereof to the positive electrode of the main capacitor 24, and also connected to the capacitor 17 at the other terminal thereof. The capacitor 17 is connected to the resistor 16 at a terminal thereof, and is also connected to a trigger coil 22 at the other terminal thereof. Reference numeral 18 denotes a thyristor, whose anode is connected to the capacitor 17 and whose cathode is connected to the negative electrode of the main capacitor 24.

Reference numerals 20 and 21 designate a capacitor and a resistor, respectively. The capacitor 20 and the resistor 21 are parallel-connected to each other and are also connected between a gate of the thyristor 18 and the negative electrode of the main capacitor 24. Reference numeral 19 denotes a resistor connected between the gate of the thyristor 18 and the control IC 101.

The voltage of the capacitor 17 charged by the resistor 16 is discharged by a loop comprising the capacitor 17, the thyristor 18, and the trigger coil 22. Thus, a trigger voltage is generated in the trigger coil 22.

Reference numeral 23 designates a discharge tube that receives the generated trigger voltage from the trigger coil 22, and that emits light due to the electric charges stored in the main capacitor 24.

Reference numeral 104 designates a microcomputer. The control IC 101 incorporates the microcomputer 104. Microcomputer 104 controls a metering unit 111, a focusing unit 112, a lens driving unit 113, a film transport unit 114, and a shutter driving unit 115 to thereby perform camera sequences, such as light-measurement, focusing, lens driving, and film transport. The control IC 101 also controls a flash unit.

In the first embodiment, an analog-to-digital (A/D) circuit is employed as the charging-voltage detection circuit 103. The charging-voltage detection circuit (that is, the A/D circuit) 103 digitalizes the voltage that is divided by using a resistance ratio between the resistors 12 and 13. The detection circuit 103 detects whether or not the voltage digitalized by A/D conversion reaches a predetermined voltage. A comparator circuit may be employed as the charging-voltage detection circuit 103. In this case, the charging-voltage detection circuit (that is, the comparator circuit) 103 detects whether the voltage, which is divided by using the resistance ratio between the resistors 12 and 13, reaches a predetermined voltage.

The microcomputer 104 controls the control IC 101.

The signal A is a charging control signal. When the level of the signal A is high, this signal causes the flash unit (thus, the flash charging unit) to perform a charging operation. When the level of the signal A is low, this signal causes the flash unit to stop the charging operation. The signal B is outputted from the comparator 4 and is a gate input signal (sometimes referred to as a primary driving signal) of the FET 5, which drives the primary current of the transformer 3.

The primary current C is caused by turning on the FET 5 to flow through the primary winding of the transformer 3. The secondary current D flows through the secondary winding of the transformer 3 after the driving of the current flowing through the primary winding of the transformer 3 is stopped. The terminal E is a positive input terminal of the comparator 4. A voltage, whose value is represented by the charging control signal A and is nearly equal to that of the voltage $V_{cc}$ of the auxiliary power supply, is divided by using the resistance ratio between the resistors 28 and 29. A resultant voltage is inputted to this positive input terminal E of the comparator 4. A voltage of about 0.1 V is inputted to the input terminal E of the comparator 4.

The terminal F is a negative input terminal of the comparator 4. A voltage, whose level is represented by a source output signal G of the FET 5, is inputted to the negative input terminal of the comparator 4 through the resistor 31. The value of the voltage, which is represented by the source output signal G, is determined by the primary current C, which flows through the primary winding of the transformer 3, and the resistor 36.

Figure 2:
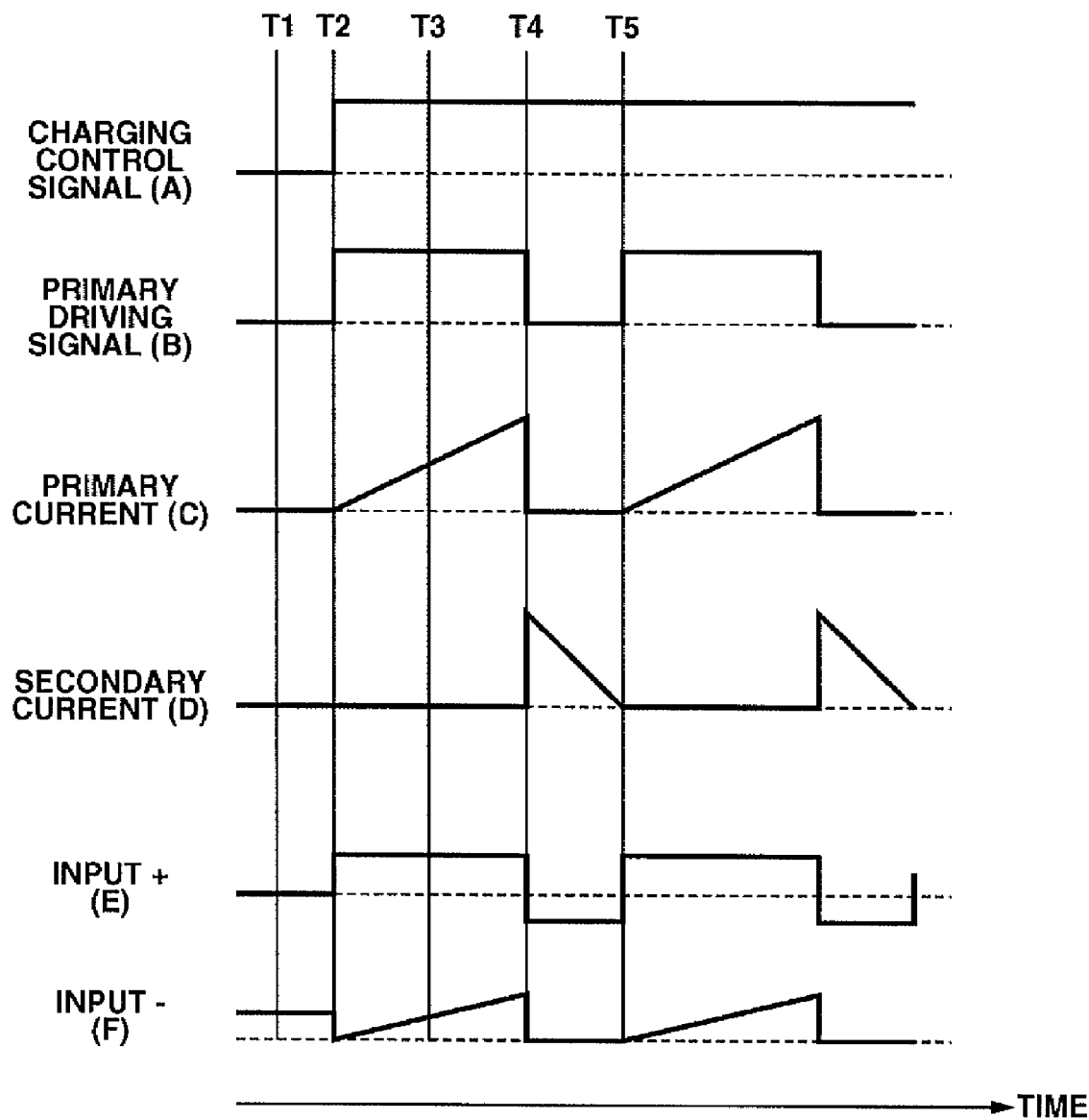
FIG. 2 is a timing chart showing a fundamental operation of the flash charging circuit according to the first embodiment.

Next, a fundamental operation of the flash charging circuit according to the first embodiment is described by referring to the diagram of FIG. 1 and to the timing chart of FIG. 2.

At moment T1, the signal level of a charging control signal A outputted from the control IC 101 is a low level. Similarly, the level of a voltage represented by an input signal inputted to the input terminal E of the comparator 4 is a low level, because this voltage is obtained by using the resistance ratio between the resistors 28 and 29 and by dividing the voltage represented by the charging control signal A. The transistor 27 receives the charging control signal A at the base thereof through the resistor 26, so that the transistor 27 is in an ON-state. Thus, a voltage ($V_{cc}-V_{ce}$) obtained by subtracting a collector-emitter-voltage $V_{ce}$ of the transistor 27 from the voltage $V_{cc}$ of the auxiliary power supply is applied to the resistor 30.

Consequently, a voltage obtained by dividing the voltage ($V_{cc}-V_{ce}$) by using a resistance ratio between the resistor 30 and the combined resistance of the resistors 31 and 36 is inputted to the input terminal F of the comparator 4. That is, the voltage, whose level is higher than the low level of the voltage inputted to the input terminal E of the comparator 4, is inputted to the input terminal F thereof. Thus, the signal level of the primary driving signal B is the low level, so that an OFF-state of the FET 5 is maintained, and that the charging operation is stopped.

At moment T2, a charging operation is started by setting the signal level of the charging control signal A at a high level. Then, a voltage obtained by dividing a voltage, whose value is represented by the charging control signal A and is nearly equal to that of the voltage $V_{cc}$ of the auxiliary power supply, by using the resistance ratio between the resistors 28 and 29 is inputted to the input terminal E of the comparator 4 as a reference voltage for detecting the primary current C of the transformer 3.

The transistor 27 receives the charging control signal A, whose signal level is a high level, at the base thereof through the resistor 26, so that the transistor 27 is in an OFF-state. Thus, a voltage generated in the resistor 36 by feeding the primary current C of the transformer 3 thereto is inputted through the resistor 31 to the input terminal F of the comparator 4. At moment T2, the primary current C of the transformer 3 does not flow therethrough. That is, the voltage at the input terminal F of the comparator 4 is 0V, that is, at the ground level (GND).

Thus, at moment T1, an input condition for the comparator 4 is that the voltage at the input terminal F of the comparator 4 is higher than the voltage at the input terminal E thereof (INPUT$_+$(E)<INPUT_(F)). At moment T2, the input condition is that the voltage at the input terminal E of the comparator 4 is higher than the voltage at the input terminal F thereof (INPUT$_+$(E)>INPUT_(F)). Thus, the input condition is reversed. Consequently, the signal level of the primary driving signal B (that is, the gate input signal), which is an output signal of the comparator 4, becomes a high level, so that the FET 5 is put into an ON-state, that the FET 5 is brought into an ON-state, and that the driving of the primary current C of the transformer 3 is started (that is, the primary current C thereof starts flowing).

In an interval between the moment T2 to the moment T4, the current flows in a loop comprising the positive electrode of the battery 1, the primary winding of the transformer 3, the drain and the source of the FET 5, the resistor 36, and the negative electrode of the battery 1. Thus, an induced electromotive force is generated in the secondary winding of the transformer 3. However, the polarity of this current is such that the current is blocked by the high-voltage rectifier diode 7. Thus, no exciting current flows from the transformer 3, so that energy is stored in the transformer (that is, the core). At moment T4, the circuit waits for the inversion of the magnitude relation between the voltage at the input terminal E of the comparator 4 and the voltage at the input terminal F thereof.

In the interval between the moments T2 and T4, the FET 5, which starts the driving, causes the primary current of the transformer 3 to flow, as illustrated in FIG. 2. The voltage generated at the resistor 36 causes the voltage at the input terminal F of the comparator 4 to rise in proportion to the primary current C of the transformer 3. The relation between the voltage at the input terminal E of the comparator 4, which is a reference voltage for detecting the primary current C of the transformer 3, and the voltage at the input terminal F of the comparator 4, which is a voltage for detecting the primary current C of the transformer 3, is changed as follows. That is, in the interval between the moments T2 to T4, the voltage at the input terminal E of the comparator 4 is higher than the voltage at the input terminal F thereof (INPUT$_+$(E)>INPUT_(F)). Conversely, at moment T4, the voltage at the input terminal F of the comparator 4 is higher than the voltage at the input terminal E thereof (INPUT$_+$(E)<INPUT_(F)). Thus, the input condition is inverted.

In response to this inversion of the input condition, the signal level of the primary driving signal B (that is, the gate input signal of the FET 5), which is an output signal of the comparator 4, is inverted from the high level to the low level. The FET 5 turns off in response to the primary driving signal B (that is, the gate input signal of the FET 5) inverted to the low level, so that the driving of the primary current C of the transformer 3 stops (that is, the primary current C stops flowing).

When the reference voltage for detecting the primary current C of the transformer 3 is set at a high voltage, a voltage loss is increased in the resistor 36 for detecting the primary current of the transformer 3. That is, it is desirable that the reference voltage (at the input terminal E of the comparator 4)

for detecting the primary current C of the transformer 3 is low in comparison with efficiency. Thus, in the first embodiment, the reference voltage for detecting the primary current C of the transformer 3 is set in the following manner.

Assuming that the voltage (about 3.3V) represented by the charging control signal A is substantially equal to the voltage of the ordinary auxiliary power supply $V_{cc}$, and that the reference voltage for detecting the primary current C of the transformer 3 is 0.1 V, the value of the resistor 28 for dividing the voltage is set to be about 30 times the value of the resistor 29.

Thus, when the driving of the primary current C of the transformer 3 is stopped, a back electromotive force is generated in the secondary winding of the transformer 3. In the interval between the moments T4 and T5, this back electromotive force causes electric current to flow in a loop, which comprises the rectifier diode 15, the main capacitor 24, the resistor 8, the transistor 9, and the high-voltage rectifier diode 7, as the secondary current D made to flow through the secondary winding of the transformer 3. Electric charges are stored in the main capacitor 24.

Then, a voltage is generated in the resistor 8 due to the secondary current D made by the back electromotive force generated in the secondary winding of the transformer 3. This voltage is applied between the base and the emitter of the transistor 9, so that the transistor 9 is turned on. Thus, a base-emitter voltage (GND–$V_{be}$), which is determined with respect to the ground potential, is applied to a resistor 10 connected to the collector of the transistor 9. That is, a voltage of about –0.7V is applied to the resistor 10.

At that time, the resistors 10 and 29 are set so that a voltage of about –0.2V is applied to the input terminal E of the comparator 4. The rating at an input terminal of an ordinary general-purpose comparator is about –0.3V, so that an input to the input terminal E of the comparator 4 is set at about –0.2V.

When the reference voltage is 0.1V, as described above, the value of the resistor 28 for dividing the voltage is about 30 times that of the resistor 29. Therefore, when an input signal to the input terminal E of the comparator 4 is set, the resistor 28 is substantially negligible. Based on this condition, the following setting is performed such that a voltage of –0.2V is applied to the input terminal E of the comparator 4. The difference in potential between the ground potential (GND) and the collector voltage of the transistor 9 is about –0.7V. Thus, to obtain a divided voltage of about –0.2V to be applied to the input terminal E of the comparator 4, the resistance ratio between the resistors 10 and 29 is set so that a ratio of the value of the resistor 10 to the value of the resistor 29 is approximately 2:1 (that is, the value of the resistor 10 is nearly twice the value of the resistor 29). As a result of setting the resistors 10 and 29 in this manner, the voltage at the input terminal E of the comparator 4 is about –0.2V.

As described above, in the first embodiment, the resistor 8, the transistor 9, and the resistor 10 constitute a second reference voltage control circuit.

Turning back to the timing chart shown in FIG. 2, at moment T4, the FET 5 is in an OFF-state. The driving of the primary current of the transformer 3 is stopped. Thus, the voltage of the resistor 36 is at the GND level, so that the voltage at the input terminal F of the comparator 4 is 0V. Consequently, the voltage at the input terminal F of the comparator 4 is higher than that at the input terminal E thereof (INPUT$_+$(E)<INPUT$_-$(F)). The signal level of the primary driving signal B (that is, the gate input signal of the FET 5), which is an output signal of the comparator 4, is a low level, so that the driving of the primary current of the transformer 3 is stopped.

At moment T5, the secondary current D of the transformer 3 stops flowing or comes to have a current value that is equal to or less than a predetermined value. Consequently, the voltage generated in the resistor 8 is equal to or lower than the base-emitter voltage $V_{be}$ of the transistor 9. Thus, the transistor turns off. The collector thereof is opened. Then, the voltage obtained by dividing the voltage, whose level is represented by the charging control signal A, by using the resistance ratio between the resistors 28 and 29 is inputted again to the input terminal E of the comparator 4. Thus, the voltage at the input terminal E of the comparator 4 is higher than that at the input terminal F thereof (INPUT$_+$(E)>INPUT$_-$(F)). Consequently, the input condition is inverted.

As a result of this inversion, the signal level of the primary driving signal B (that is, the gate input signal of the FET 5), which is an output signal of the comparator 4, is changed to a high level. The FET 5 is brought into an ON-state. The driving of the primary current of the transformer 3 is resumed. Electric charges are stored in the main capacitor 24 by repeating this charging operation.

The aforementioned operation is the fundamental operation of the flash charging circuit of the first embodiment.

That is, to detect the primary current C flowing through the first winding of the transformer 3, the voltage inputted to the input terminal F of the comparator 4 is compared in the comparator 4 with the reference voltage inputted to the input terminal E thereof. According to a result of the comparison, it is detected that the predetermined primary current C flows through the primary winding of the transformer 3. When the primary current flowing through the primary winding of the transformer 3 is turned off by the FET 5, the level of the reference voltage (that is, the voltage at the input terminal E of the comparator 4) for detecting the primary current C of the transformer 3 is changed to a negative or minus potential level by using the transistor 9, which is turned on by causing the secondary current D of the transformed 3 to flow, and also using the resistors 8 and 10. Both the detection and the control of the primary current C of the transformer 3 are enabled by using a single inexpensive general-purpose comparator. Consequently, a capacitor charging circuit (or flyback charging circuit) can be realized at low cost.

Second Embodiment

Next, a second embodiment of the invention is described. In the following description, elements of the second embodiment which are the same as those of the first embodiment, are designated by the same reference characters used in the previous description of the first embodiment. Thus, detailed descriptions of these elements are omitted herein.

Interlayer capacitance is generated between the primary winding and the secondary winding of the transformer 3 shown in FIG. 1. Also, a delay of an operation of the transistor 9 occurs. Thus, at moment T4 shown in FIG. 2, an abnormal operation may occur. A flash charging circuit according to the second embodiment prevents this abnormal operation.

Hereinafter, this abnormal operation is described by referring to a timing chart of FIG. 3. Also, it is described by using a timing chart shown in FIG. 4 that the abnormal operation is prevented and a normal operation is performed by replacing the flash charging circuit of the first embodiment with a flash charging circuit shown in FIG. 5.

Figure 3:
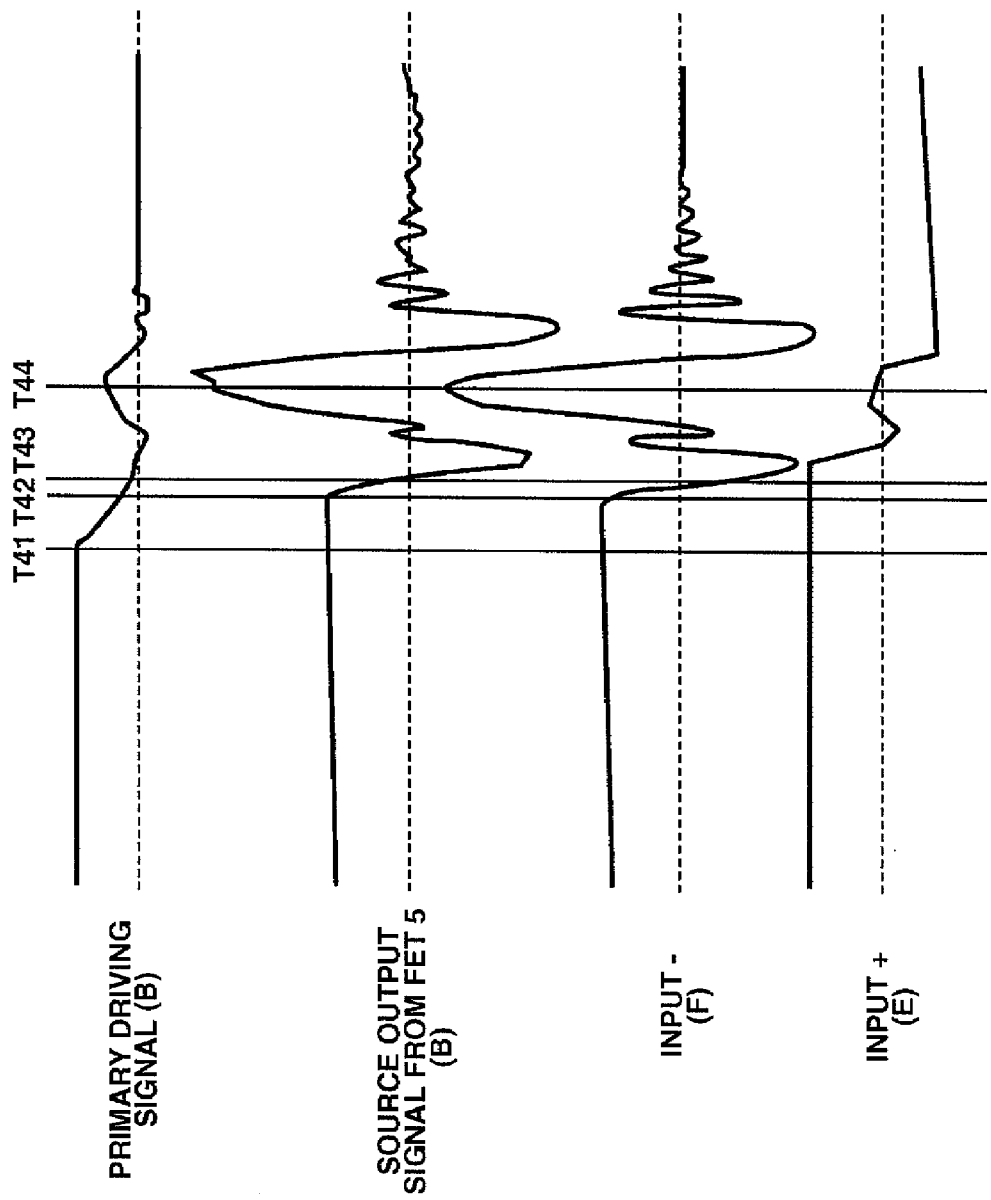
FIG. 3 is a timing chart showing an expanded view of the vicinity of a moment T4 shown in the timing chart of FIG. 2.

FIG. 3 is a timing chart showing an expanded view of the vicinity of the moment T4 indicated in the timing chart shown in FIG. 2.

In the flash charging circuit shown in FIG. 1, the signal level of the primary driving signal B (that is, the gate input signal of the FET 5), which is an output signal of the comparator 4, starts to be reversed to a low level from a high level in response to the event that the voltage of the resistor 36 for detecting the primary current C of the transformer 3 is higher than the voltage at the input terminal E of the comparator 4 at moment T41.

At moment T42, the voltage level represented by the primary driving signal B (that is, the gate input signal of the FET 5) reaches an OFF-level.

Potential at a primary current detection portion G starts lowering as the primary current C of the transformer 3 decreases. Similarly to the potential at the primary current detection portion G, the voltage (INPUT_) at the negative input terminal F of the comparator 4 starts lowering, because this voltage is inputted through the resistor 31.

With reduction in the primary current C of the transformer 3, a back electromotive force is generated in the secondary winding of the transformer 3. This back electromotive force causes the secondary current D to flow through the secondary winding of the transformer 3. This secondary current D flows through a loop that comprises the rectifier diode 15, the main capacitor 24, the resistor 8, the transistor 9, and the high-voltage rectifier diode 7. Thus, electric charges are stored in the main capacitor 24. The secondary current D flowing through the secondary winding of the transformer 3 causes a voltage in the resistor 8. When the level of this voltage reaches that of a voltage (a base-emitter voltage $V_{be}$ of 0.6 to 0.7V), at which the transistor 9 is turned on, it is supposed that the transistor 9 is turned on, and that the level of potential (INPUT$_+$(E)) at the input terminal E of the comparator 4 is a negative or minus potential level.

However, there is interlayer capacitance between the primary winding and the secondary winding of the transformer 3. Also, a delay of an operation of the transistor 9 occurs. Thus, the voltage (INPUT$_+$) at the positive input terminal E of the comparator 4 is maintained at the reference voltage for detecting the primary current C of the transformer 3. At moment T43 shown in FIG. 3, the transistor 9 is maintained in an OFF-state even when the voltage at the primary current detection portion G is 0V (that is, the primary current C of the transformer 3 is 0 A). At moment T44 being later than the moment T43, the collector voltage of the transistor 9 starts reversing.

However, in the interval between the moments T41 and T42, the voltage at the input terminal F of the comparator 4 is higher than that at the input terminal E thereof ((INPUT$_+$(E) <INPUT_(F)). The signal level of the primary driving signal B (that is, the gate input signal of the FET 5), which is an output signal of the comparator 4, is a low level. In the interval between the moments T42 and T44, the inversion of the collector voltage of the transistor 9 is delayed, so that the voltage at the input terminal E of the comparator 4 is higher than that at the input terminal F thereof ((INPUT$_+$(E)>INPUT_(F)). Thus, the signal level of the primary driving signal B (that is, the gate input signal of the FET 5), which is an output signal of the computer 4, is a high level.

Thus, at moment T44, although the secondary current D of the transformer 3 is discharged, the voltage level represented by the primary driving signal B (that is, the gate input signal of the FET 5), which is an output signal of the comparator 4, is a potential level (that is, a high level), at which the FET can be driven. Consequently, an abnormal operation of temporarily driving the primary current of the transformer 3 is caused.

Figure 5:
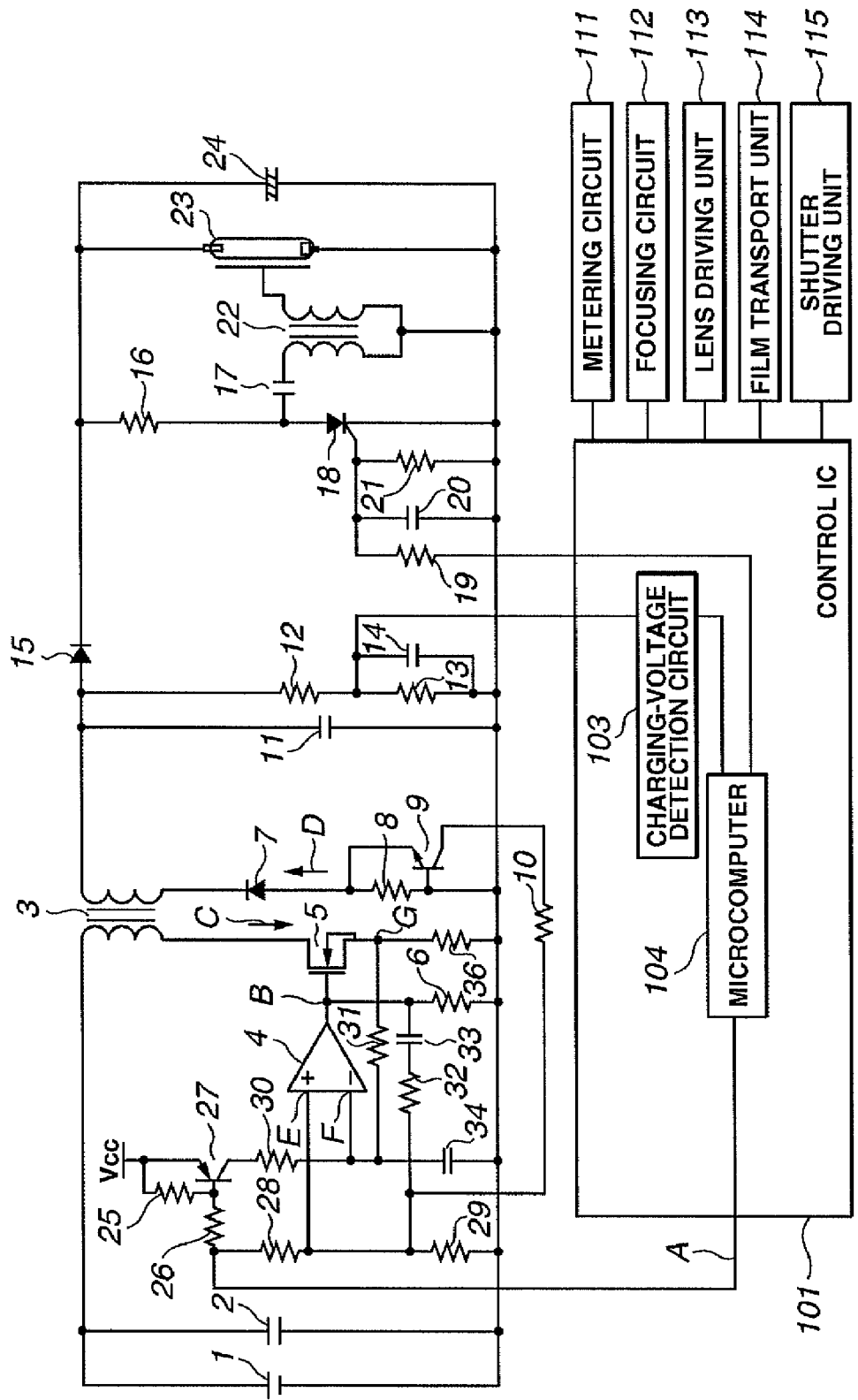
FIG. 5 is a diagram schematically showing the entire electrical configuration of the flash charging circuit according to the second embodiment.

Thus, in the second embodiment, as shown in FIG. 5, the following circuit is added to the flash charging circuit shown in FIG. 1.

In FIG. 5, reference numerals 32 and 33 designate a resistor and a capacitor, respectively. A terminal of the resistor 32 is connected to a terminal of the capacitor 33. The other terminal of the resistor 32 is connected to the input terminal E of the comparator 4. The other terminal of the capacitor 33 is connected to an output terminal of the comparator 4.

Reference 34 denotes a capacitor that is connected to the input terminal F of the comparator 4 at a terminal thereof and is also connected to the negative electrode of the battery 1.

Figure 4:
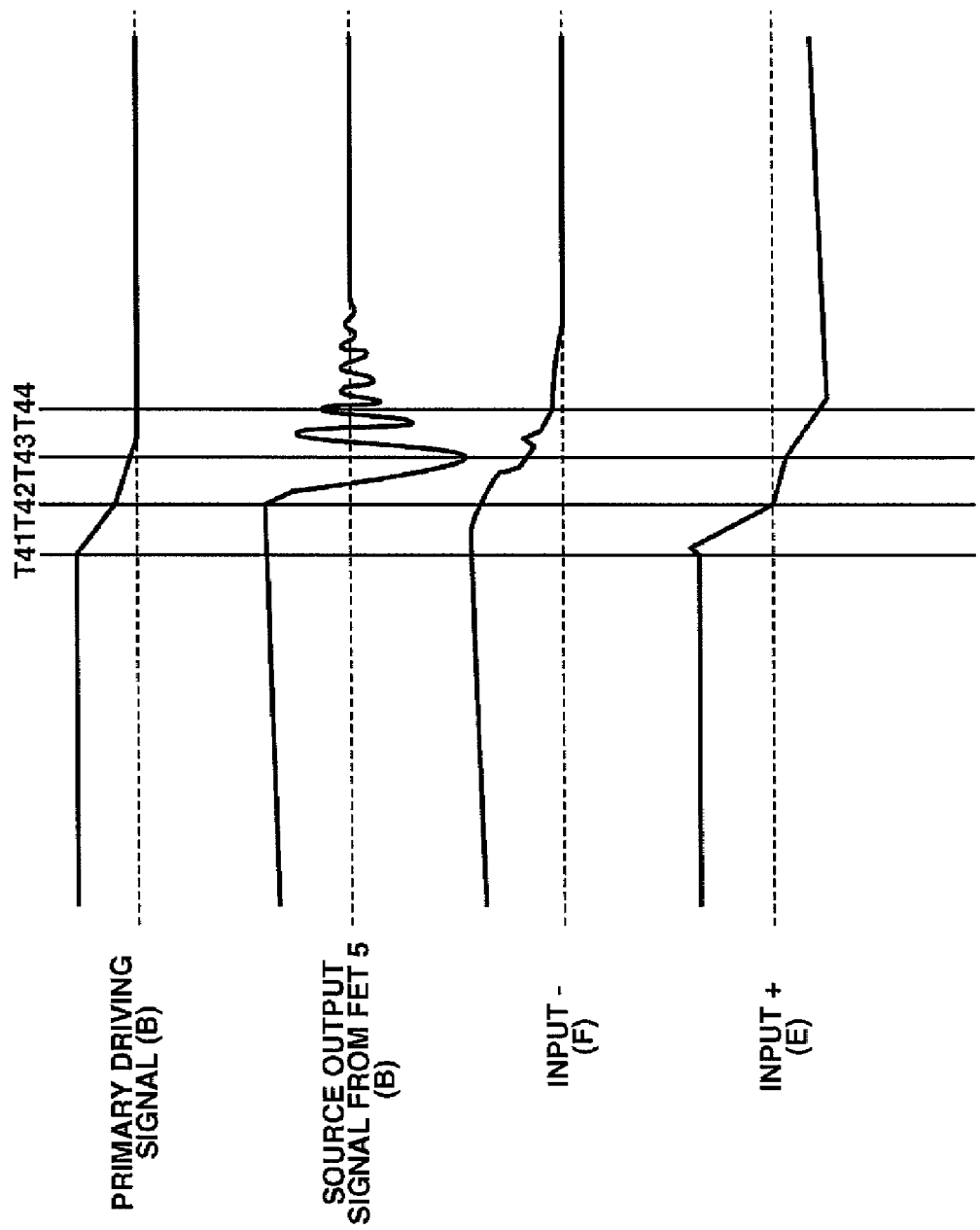
FIG. 4 is a timing chart showing an operation of a flash charging circuit according to a second embodiment of the invention.

FIG. 4 is a timing chart showing an operation of the flash charging circuit shown in FIG. 5, and more specifically, an expanded view of the vicinity of the moment 4. That is, FIG. 4 corresponds to the timing chart of FIG. 3 that illustrates the operation of the flash charging circuit of the first embodiment. Operations of the flash charging circuit of the second embodiment at moments T1, T2, T3, and T5 are similar to the corresponding operations of the flash charging circuit of the first embodiment. Therefore, the description of the operations at moments T1, T2, T3, and T5 is omitted herein.

At moment T41, the signal level of the primary driving signal B (that is, the gate input signal of the FET 5), which is an output signal of the comparator 4, starts to be reversed to a low level from a high level in response to the event that the voltage of the resistor 36 for detecting the primary current C of the transformer 3 is higher than the voltage at the input terminal E of the comparator 4. Substantially, in synchronization with this inversion, a differentiating circuit, which comprises the capacitor 33 and the resistor 32 connected to the output terminal of the comparator 4, causes the voltage, which is inputted to the input terminal E of the comparator 4 as the reference voltage for detecting the primary current C of the transformer 3 (that is, the voltage obtained by dividing a voltage, which is substantially equal to the voltage $V_{cc}$ of the auxiliary power supply by using the resistance ratio between the resistors 28 and 29) to start dropping. Thus, in the second embodiment, the capacitor 33 and the resistor 32 constitute a first reference voltage control circuit.

At moment T42, the voltage level represented by the primary driving signal B (that is, the gate input signal of the FET 5) reaches an OFF-level. Potential at the primary current detection portion G starts dropping as the primary current C of the transformer 3 decreases. The voltage (INPUT_(F)) at the negative input terminal F of the comparator 4 starts lowering behind the primary current detection portion G, because this voltage is received by the capacitor 34 through the resistor 31. Thus, in the second embodiment, the resistor 31 and the capacitor 34 constitute a delay circuit.

With reduction in the primary current C of the transformer 3, a back electromotive force is generated in the secondary winding of the transformer 3. This back electromotive force causes the secondary current D to flow through the secondary winding of the transformer 3. This secondary current D flows through a loop that comprises the rectifier diode 15, the main capacitor 24, the resistor 8, the transistor 9, and the high-voltage rectifier diode 7. Thus, electric charges are stored in the main capacitor 24. The secondary current D flowing through the secondary winding of the transformer 3 causes a voltage in the resistor 8. When the level of this voltage reaches that of a voltage (a base-emitter voltage $V_{be}$ of 0.6 to 0.7V), at which the transistor 9 is turned on, it is supposed that the transistor 9 is turned on, and that the level of potential (IN- PUT$_+$(E)) at the positive input terminal E of the comparator 4 is a negative or minus potential level.

However, as described above, due to the interlayer capacitance being present between the primary winding and the secondary winding of the transformer 3 and to the delay of an operation of the transistor 9, the potential level (INPUT$_+$(E)) at the positive input terminal E of the comparator 4 does not reach a negative or minus potential level. However, at that time, the voltage level at the input terminal E of the comparator 4 lowers to about 0 V due to the voltage drop started at moment T41 by the differentiating circuit constituted by the resistor 32 and the capacitor 33.

Thus, at moment T42 shown in FIG. 4, the condition, in which the voltage at the input terminal F of the comparator 4 is higher than the voltage at the input terminal E of the comparator 4 (INPUT$_+$(E)<INPUT$_-$(F)), is maintained. At moment T43, the potential level at the primary current detection portion G is changed to a negative or minus level owing to the noise of the transformer 3. The potential level at the input terminal F of the comparator 4 is prevented through the influence of a filter, which is constituted by the resistor 31 and the capacitor 34, from reaching a negative or minus level. Also, the voltage drop is delayed.

Then, the transistor 9 is brought into an ON-state. The collector voltage of the transistor 9 has a negative or minus level, so that the potential level at the input terminal E of the comparator 4 is a negative or minus potential level. As can be understood from data at moment T43 in FIG. 4, the condition, in which the voltage at the input terminal F of the comparator 4 is higher than the voltage at the input terminal E of the comparator 4 (INPUT$_+$(E)<INPUT$_-$(F)), is maintained.

At moment T44, which is later than the moment T43, the ON-state of the transistor 9 is saturated. The collector voltage of the transistor 9 is completely inverted. This prevents occurrence of the event that during the secondary current D of the transformer 3 is discharged, as described above, the primary current C of the transformer 3 flows, as illustrated at moment T44 in FIG. 3.

Thus, with the configuration shown in FIG. 5, the second embodiment can obtain the following advantages, in addition to the advantages of the first embodiment. That is, the second embodiment can provide a flash charging circuit enabled to perform a normal operation without being affected by the delay of the rise of the secondary current signal D due to the interlayer capacitance between the primary winding and the secondary winding of the transformer 3 and by the switching delay of the transistor 9.

The present invention is not limited to the above embodiments, and various changes and modifications can be made thereto within the spirit and scope of the present invention. Therefore, to apprise the public of the scope of the present invention, the following claims are made.

What is claimed is:

1. A capacitor charging circuit comprising:
a transformer adapted to store and discharge energy;
a main capacitor adapted to charge energy discharged from the transformer;
a switch circuit adapted to regulate a flow of an electric current in a primary winding of the transformer;
a detection control circuit adapted to control the switch circuit according to a result of a comparison between a detection voltage, which is used for detecting an electric current flowing through the primary winding of the transformer, and a reference voltage; and
a reference voltage control circuit adapted to set, after the detection control circuit causes the switch circuit to turn off an electric current flowing through the primary winding, the reference voltage to be lower than the detection voltage.

2. A capacitor charging circuit according to claim 1, wherein the detection control circuit has a comparator, wherein the comparator has a first input terminal to which the reference voltage is inputted, a second input terminal to which the detection voltage is inputted, and an output terminal for outputting the output signal to the switch circuit according to a result of a comparison between the reference voltage and the detection voltage.

3. A capacitor charging circuit according to claim 2, wherein the reference voltage control circuit has a transistor, a first resistor, and a second resistor,
wherein a base of the transistor is connected to a negative electrode of a power supply for supplying electric power to the primary winding of the transformer, wherein the base of the transistor is also connected to one terminal of the first resistor,
wherein an emitter of the transistor is connected directly or through a rectifier device to the secondary winding of the transformer, wherein the emitter of the transistor is also connected to a second terminal of the first resistor, and
wherein a collector of the transistor is connected through the second resistor to the first input terminal of the comparator.

4. A flash unit comprising:
a capacitor charging circuit, which comprises:
a transformer adapted to store and discharge energy;
a main capacitor adapted to charge energy discharged from the transformer;
a switch circuit adapted to regulate a flow of an electric current in a primary winding of the transformer;
a detection control circuit adapted to control the switch circuit according to a result of a comparison between a detection voltage, which is used for detecting an electric current flowing through the primary winding of the transformer, and a reference voltage; and
a reference voltage control circuit for setting, after the detection control circuit causes the switch circuit to turn off an electric current flowing through the primary winding, the reference voltage to be lower than the detection voltage,
wherein the flash unit flashes according to electric charges stored in the main capacitor.

5. A camera comprising:
a capacitor charging circuit, which comprises:
a transformer adapted to store and discharge energy;
a main capacitor adapted to charge energy discharged from the transformer;
a switch circuit adapted to regulate a flow of an electric current in a primary winding of the transformer;
a detection control circuit adapted to control the switch circuit according to a result of a comparison between a detection voltage, which is used for detecting an electric current flowing through the primary winding of the transformer, and a reference voltage;
a reference voltage control circuit adapted to set, after the detection control circuit causes the switch circuit to turn off an electric current flowing through the primary winding, the reference voltage to be lower than the detection voltage; and
a flash unit adapted to flash according to electric charges stored in the main capacitor.

* * * * *